United States Patent [19]

Greindl et al.

[11] Patent Number: 5,783,524
[45] Date of Patent: Jul. 21, 1998

[54] USE OF GLYCINE-N,N-DIACETIC ACID DERIVATIVES AS COMPLEXING AGENTS FOR ALKALINE EARTH METAL AND HEAVY METAL IONS IN THE PRODUCTION AND TRANSPORT OF PETROLEUM AND NATURAL GAS

[75] Inventors: Thomas Greindl, Bad Dürkheim; Wilhelmus Slotman, Ludwigshafen, both of Germany

[73] Assignee: BASF Aktiengesellschaft, Ludwigshafen, Germany

[21] Appl. No.: 567,479

[22] Filed: Dec. 5, 1995

[30] Foreign Application Priority Data

Dec. 14, 1994 [DE] Germany .......................... 44 44 347.1

[51] Int. Cl.⁶ .................. C09K 3/00; C09K 7/00; E21B 43/26; F21B 43/28
[52] U.S. Cl. .................. 507/90; 507/241; 166/250.05; 166/271; 166/310; 210/698; 210/700; 210/702
[58] Field of Search ................ 507/241, 90; 166/250.05, 166/310, 271; 210/698, 700, 701; 252/180

[56] References Cited

U.S. PATENT DOCUMENTS 4,860,829  8/1989  Carlberg et al. .......................... 166/279
4,980,027  12/1990  Morris et al. .......................... 134/22.14
5,481,018  1/1996  Athey et al. .......................... 558/442

FOREIGN PATENT DOCUMENTS 0 224 346   6/1987   European Pat. Off.

OTHER PUBLICATIONS

Chem Zvesti (1974), vol. 28, No. 3, pp. 332-335 as Abstracted by Chemical Abstract 81:177616.

Inorg. Chem. (1974) vol. 13, No. 3, pp. 550-559 as Abstracted by Chemical Abstract 80:137604.

Bull. Chem. Soc. Jap. (1971), vol. 44, No. 6 pp. 1548-1551 as Abstracted by Chemical Abstract 75:58133.

*Primary Examiner*—C. H. Kelly
*Attorney, Agent, or Firm*—Oblon, Spivak, McClelland, Maier & Neustadt, P.C.

[57] ABSTRACT

Glycine-N,N-diacetic acid derivatives and their alkali metal, alkaline earth metal, ammonium and substituted ammonium salts, used as completing agents for alkaline earth metal and heavy metal ions in the production and transport of petroleum and natural gas.

7 Claims, No Drawings

USE OF GLYCINE-N,N-DIACETIC ACID DERIVATIVES AS COMPLEXING AGENTS FOR ALKALINE EARTH METAL AND HEAVY METAL IONS IN THE PRODUCTION AND TRANSPORT OF PETROLEUM AND NATURAL GAS

FIELD OF THE INVENTION

The present invention relates to the use of glycine-N,N-diacetic acid derivatives and their alkali metal, alkaline earth metal, ammonium and substituted ammonium salts as complexing agents for alkaline earth metal and heavy metal ions in the production and transport of petroleum and natural gas.

BACKGROUND OF THE INVENTION

Complexing agents for alkaline earth metal and heavy metal ions used in a wide variety of industrial areas with their ranges of requirements and problems which in some cases differ greatly from one another are still normally systems which have been known and used for a long time such as polyphosphates, nitrilotriacetic acid or ethylenediaminetetraacetic acid. However, these agents show certain disadvantages, and the main weak points are, in particular, their calcium and manganese binding capacities which are still in need of improvement, their as yet non-optimal stabilizing action in bleaching baths and bleaching systems, and their biodegradability and ability to be eliminated, which are usually inadequate.

Thus, the use of ethylenediaminetetraacetic acid or nitrilotriacetic acid as complexing agents is recommended also for petroleum and natural gas production, for example in EP-A 224 346, but these display disadvantages on this kind of use, especially in their effectiveness and their environmental behavior.

German Patent Application P 43 19 935.6 discloses the use in general of the glycine-N,N-diacetic acid derivatives described herein as complexing agents for alkaline earth metal and heavy metal ions. A wide variety of applications is recommended, but it is not mentioned that these compounds are also suitable as auxiliaries in the petroleum and natural gas production.

SUMMARY OF THE INVENTION

It is an object of the present invention to provide sufficiently effective complexing agents which have good biodegradability for petroleum and natural gas productions.

We have found that this object is achieved by the use of glycine-N, N-diacetic acid derivatives of the general formula I

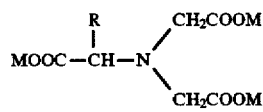

where

R is $C_1$- to $C_{30}$-alkyl or $C_2$- to $C_{30}$-alkenyl, which can additionally carry as substituents up to 5 hydroxyl groups, formyl groups, $C_1$- to $C_4$-alkoxy groups, phenoxy groups or $C_1$- to $C_4$-alkoxycarbonyl groups and be interrupted by up to 5 non-adjacent oxygen atoms, alkoxylate groups of the formula —$(CH_2)_k$—O—$(A^1O)_m$—$(A^2O)_n$—Y in which $A^1$ and $A^2$ are, independently of one another, 1,2-alkylene groups with 2 to 4 carbon atoms, Y is hydrogen, $C_1$- to $C_{12}$-alkyl, phenyl or $C_1$-to $C_4$-alkoxycarbonyl, and k is the number 1, 2 or 3, and m and n are each numbers from 0 to 50, where the total of m+n must be at least 4, phenylalkyl groups with 1 tq 20 carbon atoms in the alkyl, $C_1$- to $C_{20}$-alkyl groups carrying a five or six membered unsaturated or saturated heterocyclic ring with up to three heteroatoms from the group consisting of nitrogen, oxygen and sulfur, which can additionally be benzofused, where all the phenyl nuclei and heterocyclic rings mentioned in the meanings of R can additionally also carry as substituents up to three $C_1$- to $C_4$-alkyl groups, hydroxyl groups, carboxyl groups, sulfo groups or $C_1$- to $C_4$-alkoxycarbonyl groups, or a radical of the formula

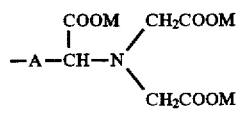

where A is a $C_1$- to $C_{12}$-alkylene bridge, preferably a $C_2$- to $C_{12}$-alkylene bridge, or a chemical bond, and M is hydrogen, alkali metal, alkaline earth metal, ammonium or substituted ammonium in the appropriate stoichiometric amounts, as complexing agents for alkaline earth metal and heavy metal ions in the production and transport of petroleum and natural gas.

DESCRIPTION OF THE PREFERRED EMBODIMENTS

In a preferred embodiment, the compounds I used are those in which R is $C_1$- to $C_{20}$-alkyl, $C_2$- to $C_{20}$-alkenyl or a radical of the formula

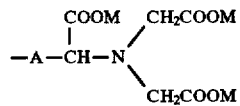

In a particularly preferred embodiment, the compounds I used are α-alanine-N,N-diacetic acid (R=$CH_3$) and its alkali metal, ammonium and substituted ammonium salts.

Particularly suitable salts of this type are the sodium, potassium and ammonium salts, in particular the trisodium, tripotassium and triammonium salt, and organic triamine salts with a tertiary nitrogen atom.

Particularly suitable bases underlying the organic amine salts are tertiary amines such as trialkylamines with 1 to 4 carbon atoms in the alkyl, such as trimethlyl and triethylamine, and trialkanolamines with 2 or 3 carbon atoms in the alkanol residue, preferably triethanolamine, tri-n-propanolamine or triisopropanolamine.

The alkaline earth metal salts which are particularly used are the calcium and magnesium salts.

Besides methyl, particularly suitable as straight-chain or branched alk(en)yl radicals for the radical R are $C_2$- to $C_7$-alkyl and -alkenyl, and of these in particular straight-chain radicals derived from saturated or unsaturated fatty acids. Examples of specific R radicals are: ethyl, n-propyl, iso-propyl, n-butyl, iso-butyl, sec-butyl, tert-butyl, n-pentyl, iso-pentyl, tert-pentyl, neopentyl, n-hexyl, n-heptyl, 3-heptyl (derived from 2-ethylhexanoic acid), n-octyl, iso-octyl (derived from iso-nonanoic acid), n-nonyl, n-decyl, n-undecyl, n-dodecyl, iso-dodecyl (derived from iostridecanoic [sic] acid), n-tridecyl, n-tetradecyl, n-pentadecyl, n-hexadecyl, n-heptadecyl, n-octadecyl, n-nonadecyl, n-eicosyl and n-heptadecenyl (derived from oleic acid). Mixtures may also occur for R, in particular those derived from naturally occurring fatty acids and from synthetically produced industrial acids, for example by the oxo synthesis.

$C_1$- to $C_{12}$-alkylene bridges A used are, in particular, polymethylene groups of the formula —$(CH_2)_k$—, in which k is a number from 2 to 12, in particular from 2 to 8, i.e. 1,2-ethylene, 1,3-propylene, 1,4-butylene, pentamethylene, hexamethylene, heptamethylene, octamethylene, nonamethylene, decamethylene, undecamethylene and dodecamethylene. Hexamethylene, octamethylene, 1,2-ethylene and 1,4-butylene are particularly preferred in this connection. However, it is also possible for branched $C_1$- to $C_{12}$-alkylene groups to occur besides, e.g. —$H_2CH(CH_3)CH_2$—, —$H_2C(CH_3)_2CH_2$—, —$H_2CH(C_2H_5)$—or —$H_2CH(CH_3)$—.

The $C_1$- to $C_{30}$-alkyl and $C_2$- to $C_{30}$-alkenyl groups can carry up to 5, in particular up to 3, additional substituents of the said type and be interrupted by up to 5, in particular up to 3, non-adjacent oxygen atoms. Examples of such substituted alk(en)yl groups are —$CH_2OH$, —$H_2CH_2OH$, —$H_2CH_2$—O—$CH_3$, —$H_2CH_2$—$H_2CH_2$ O—$CH_3$, —$CH_2O$—$CH_2CH_3$, —$CH_2$—O—$CH_2CH_2$—OH, —$CH_2$—CHO, —$CH_2OPh$, —$CH_2$—$COOCH_3$ or —$CH_2CH_2$—$COOCH_3$.

Particularly suitable alkoxylate groups are those in which m and n are each numbers from 0 to 30, in particular from 0 to 15. $A^1$ and $A^2$ are groups derived from butylene oxide and, in particular, from propylene oxide and from ethylene oxide. Of particular interest are pure ethoxylates and pure propoxylates, but ethylene oxide/propylene oxide block structures can also occur.

Suitable five or six-membered unsaturated or saturated heterocyclic rings with up to three heteroatoms from the group consisting of nitrogen, oxygen and sulfur, which can additionally be benzo-fused and substituted by the specified radicals, are:

tetrahydrofuran, furan, tetrahydrothiophene, thiophene, 2,5-dimethylthiophene, pyrrolidine, pyrroline, pyrrole, isoxazole, oxazole, thiazole, pyrazole, imidazoline, imidazole, 1,2,3-triazolidine, 1,2,3- and 1,2,4-triazole, 1,2, 3-, 1,2,4- and 1,2,5-oxadiazole, tetrahydropyran, dihydropyran, 2H- and 4H-pyran, piperidine, 1,3- and 1,4-dioxane, morpholine, pyrazane, pyridine, α-,β- and γ-picoline, α- and γ-piperidone, pyrimidine, pyridazine, pyrazine, 1,2,5-oxathiazine, 1,3,5-, 1,2,3- and 1,2,4-triazine, benzofuran, thionaphthene, indoline, indole, isoindoline, benzoxazole, indazole, benzimidazole, chroman, isochroman, 2H- and 4H-chromene, quinoline, isoquinoline, 1,2,3,4-tetrahydroisoquinoline, cinnoline, quinazoline, quinoxaline, phthalazine and benzo-1,2,3-triazine.

N—H groups in the said heterocyclic rings should where possible be present in derivatized form, for example as N-alkyl group.

In the case of substitution on the phenyl nuclei or the heterocyclic rings there are preferably two (identical or different) or, in particular, a single substituent.

Examples of optionally substituted phenylalkyl groups and alkyl groups carrying heterocyclic rings for R are benzyl, 2-phenylethyl, 3-phenylpropyl, 4-phenylbutyl, o-, m- or p-hydroxylbenzyl, o-, m- or p-carboxylbenzyl, o-, m- or p-sulfobenzyl, o-, m- or p-methoxy or -ethoxycarbonylbenzyl, 2-furylmethyl, N-methylpiperidin-4-ylmethyl or 2-, 3- or 4-pyridinylmethyl.

In the case of substitution on phenyl nuclei and on heterocyclic rings, preferably groups which confer solubility in water, such as hydroxyl groups, carboxyl groups or sulfo groups, occur.

Also to be regarded as examples of the said $C_1$- to $C_4$-, $C_1$- to $C_{12}$- and $C_1$- to $C_{20}$-alkyl groups are the corresponding radicals listed above for R.

The use according to the invention of the compounds I eliminates mainly deposits of alkaline earth metal carbonates and sulfates which often occur in petroleum and natural gas production. If phosphoric acid is used as auxiliary, it is also possible to prevent or eliminate the occurrence of deposits of alkaline earth metal phosphates. The deposits may form in the underground petroleum or natural gas formation, in the borehole or in the above ground transport lines and storage containers as long as water is present.

The deposits occur in the form of salt precipitates from water containing extracted products in particular because during the production of petroleum and natural gas the physical parameters of the produced liquids, such as pressure and temperature, change greatly on the way from the reservoir through the borehole, the lines and the treatment systems.

The compounds I can also be used in conjunction with conventional scale inhibitors, especially those based on polyacrylates, polymaleic anhydride, phosphonates and phosphate esters, it being possible in many cases for the synergistic advancement of the action in the removal of deposits to occur.

Water is normally injected into petroleum reservoirs in order to achieve better depletion or to maintain or increase the reservoir pressure. This injected water may lead, together with the reservoir water which is present, to precipitates if one contains dissolved alkaline earth metal ions and the other contains dissolved sulfate, carbonate and/or bicarbonate ions. The precipitates then lead to blockages in the porous rock and make it difficult to inject the water and extract the petroleum or natural gas.

Inorganic and/or organic acids such as hydrofluoric acid, hydrochloric acid, formic acid or acetic acid are used in special treatments to clean the perforation and the reservoir rock or for partly dissolving the reservoir rock. The aqueous liquids resulting therefrom may frequently contain iron ions, which may lead to precipitates of undissolved iron compounds. The compounds I are also able to prevent and eliminate such precipitates.

The advantage of the compounds I used according to the invention is the more effective dissolving or redissolving of deposited or precipitated alkaline earth metal compounds and generally of insoluble heavy metal compounds.

Other advantages of the compounds I are their very low potential toxicity and their good biodegradability. Thus, α-alanin-N,N-di-acetic acid shows a biodegradability of >90% in the Zahn-Wellens test under standard conditions (28-day value), whereas, for example, ethylenediaminetetraacetic acid gives a value of <10% under the same conditions.

We claim:

1. A process for complexing alkaline earth and heavy metal ions in petroleum or natural gas or both, which comprises adding to said petroleum or natural gas or both containing said alkaline earth and heavy metal ions an effective amount of a glycine-N,N-diacetic acid compound of the formula (I):

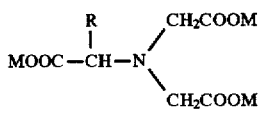

wherein:

R is $C_1$–$C_{30}$-alkyl or $C_2$–$C_{30}$-alkenyl, each of which is unsubstituted orS substituted with up to 5 hydroxyl groups, formyl groups, $C_1$–$C_4$-alkoxy groups, phenoxy groups or $C_1$–$C_4$-alkoxycarbonyl groups and which are uninterrupted or interrupted by up to five non-adjacent oxygen atoms, phenylalkyl groups with 1 to 20 carbon atoms in the alkyl group, $C_1$–$C_{20}$-alkyl groups substituted with an unsaturated or saturated heterocyclic ring with up to three heteroatoms therein selected from the group consisting of nitrogen, oxygen and sulfur, wherein the heterocyclic ring is optionally benzo-fused, and wherein all of the phenyl nuclei and heterocyclic rings defined by R are optionally substituted with up to three $C_1$–$C_4$-alkyl groups, hydroxyl groups, carboxyl groups, sulfo groups, or $C_1$–$C_4$-alkoxycarbonyl groups, or a radical of the formula:

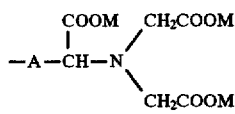

wherein A is a $C_1$ –$C_{12}$-alkylene bridge o; a chemical bond, and

M is hydrogen, alkali metal, allaline earth metal, ammonium or substituted ammonium.

2. The process of claim 1, wherein in the glycine-N,N-diacetic acid compound of the formula (1), R is $C_1$–$C_{20}$-alkyl, $C_2$–$C_{20}$-alkenyl or a radical of the formula:

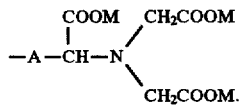

3. The process of claim 1, wherein the glycine-N,N-diacetic acid compound of the formula (I) is α-alanine-N, N-diacetic acid or the alkali metal, ammonium or substituted ammonium salts thereof.

4. The process of claim 1, wherein in said glycine -N,N-diacetic acid compound R is an alkoxylate group of the formula:

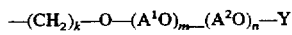

wherein $A^1$ and $A^2$ each, independently of the other, represents 1,2-alkylene groups having 2 to 4 carbon atoms, wherein Y is hydrogen, $C_1C_{12}$-alkyl, phenyl or $C_1$–$C_4$-alkoxycarbonyl; k is 1,2 or 3; and m and n are each from 0 to 50, wherein the total of (m+n) is at least 4.

5. The process of claim 1, wherein said complexing is effecting during production or transportation or both of petroleum or natural gas or both.

6. The process of claim 1, wherein in said glycine-N,N-diacetic acid compound, said heterocyclic ring is selected from the group consisting of tetrahydrofuran, furan, tetrahydrothiophene, thiophene, 2,5-dimethylthiophene, pyrrolidine, pyrroline, pyrrole, isoxazole, oxazole, thiazole, pyrazole, imidazoline, imidazole, 1,2,3-triazolidine, 1,2,3- and 1,2,4-triazole, 1,2,3-, 1,2,4- and 1,2,5-oxadiazole, tetrahydropyran, dihydropyran, 2H- and 4H-pyran, piperidine, 1,3- and 1,4-dioxane, morpholine, pyrazane, pyridine, α-, β- and γ-picoline, α- and γ-piperidone, pyrimidine, pyridazine, pyrazine, 1,2,5-oxathiazine, 1,3,5-, 1,2,3- and 1,2,4-triaiine, benzofuran, thionaphthene, indoline, indole, isoindoline, benzoxazole, indazole, benzimidazole, chroman, isochroman, 2H- and 4H-chromene, quinoline, isoquinoline, 1,2,3,4-tetrahydroisoquinoline, cinnoline, quinazoline, quinoxaline, phthalazine and benzo-1,2,3-triazine.

7. The process of claim 1, wherein said glycine -N,N-, diacetic acid compound has a biodegradability of >90% in the Zahn-Wellens test under standard conditions.

* * * * *

UNITED STATES PATENT AND TRADEMARK OFFICE
CERTIFICATE OF CORRECTION

PATENT NO. : 5,783,524
DATED : July 21, 1998
INVENTOR(S) : Thomas Greindl, et al.

It is certified that error appears in the above-identified patent and that said Letters Patent is hereby corrected as shown below:

On title page, [57] Abstract line 3, "as completing agents" should read --as complexing agents--.

Column 1, Line 64, "Y in which $A^1$" should read --Y, in which $A^1$--.

Column 2, Line 3, "with 1 tq 20" should read --with 1 to 20--.

Column 3, Line 36, "Suitable five or six-membered" should read --Suitable five- or six-membered--.

Column 5, Line 8, "orS" should read --or--.

Column 5, Line 29, "o;" should read --or--.

Column 6, Line 12, "$C_1$ $C_{12}$-alkyl." should read --$C_1$-$C_{12}$-alkyl.--.

Signed and Sealed this

First Day of June, 1999

Attest:

Q. TODD DICKINSON

*Attesting Officer*          *Acting Commissioner of Patents and Trademarks*